No. 774,733. PATENTED NOV. 15, 1904.
W. H. BARNES.
RAILWAY TICKET.
APPLICATION FILED JAN. 21, 1904.
NO MODEL. 3 SHEETS—SHEET 1.

*Fig. 1.*

WITNESSES:
W. F. Doyle
J. S. Powers.

INVENTOR
William H. Barnes
by
Attorneys

No. 774,733. PATENTED NOV. 15, 1904.
W. H. BARNES.
RAILWAY TICKET.
APPLICATION FILED JAN. 21, 1904.
NO MODEL. 3 SHEETS—SHEET 2.

*Fig. 2.*

D

AUDITOR'S STUB
TICKET AGENT SELLING THIS TICKET MUST HAND THE TRIPLEX TO PASSENGER INTACT, AND FORWARD THIS COUPON TO AUDITOR OF RECEIPTS.

J 296 555743 | OFFICE NO. CONSECUTIVE NO.
QUINCY TO CHICAGO
DOUBLE LOWER BERTH
TWO DOLLARS
NOT TRANSFERABLE
LOCATION | TRAIN TIME | NO. CAR

---

C

———————————— COMPANY
CONDUCTOR
THIS TRIPLEX TICKET IS GOOD FOR THIS CAR AND DATE ONLY WHEN ACCOMPANIED BY FIRST CLASS RAILWAY TICKETS. CONDUCTOR WILL DETACH THIS TICKET AND TURN IT IN TO RECEIVING CASHIER WITH OTHER TICKETS AND COLLECTIONS.

J 296 555743
QUINCY TO CHICAGO
DOUBLE LOWER BERTH
TWO DOLLARS
NOT TRANSFERABLE
LOCATION | TRAIN TIME | CAR NO. | LINE NO.
NUMBER OF PASSENGERS 3 2 1

---

B

AUDITOR (PORTER)
———————————— COMPANY
AS AN AUTHORITY FOR MAKING UP BERTH, THIS TICKET MUST BE SURRENDERED TO THE PORTER WHO WILL TURN IT INTO THE NEAREST DIST. SUPTS OFFICE TO BE FORWARDED TO THE AUDITOR OF RECEIPTS

J 296 555743 | TRAIN CONDUCTOR'S 1,2,3,4,5,6,7,8,9,10
QUINCY TO CHICAGO
DOUBLE LOWER BERTH
TWO DOLLARS.
NOT TRANSFERABLE.
THIS CHECK SUBJECT TO RY. TRAIN CONDUCTOR'S INSPECTION.
LOCATION | TRAIN TIME | CAR NO. | LINE NO.
NUMBER OF PASSENGERS 3 2 1

---

A

———————————— COMPANY
PASSENGER
THIS PORTION OF TICKET WILL BE HANDED TO PASSENGER BY THE CONDUCTOR, WHO IS HEREBY REQUESTED TO RETAIN AS A VOUCHER, IT ALSO SHOWS CAR AND LOCATION.

J 296 555743
QUINCY TO CHICAGO
DOUBLE LOWER BERTH—TWO DOLLARS
NOT TRANSFERABLE
GOOD ONLY FOR THIS CAR AND DATE STAMPED ON BACK AND MUST BE ACCOMPANIED BY FIRST CLASS RY. TICKET
LOCATION | TRAIN TIME | CAR NO. | LINE NO.
NUMBER OF PASSENGERS 3 2 1

WITNESSES:
W. F. Doyle
J. E. Bowers

INVENTOR
William H. Barnes
by
S. T. Conrad
Attorneys

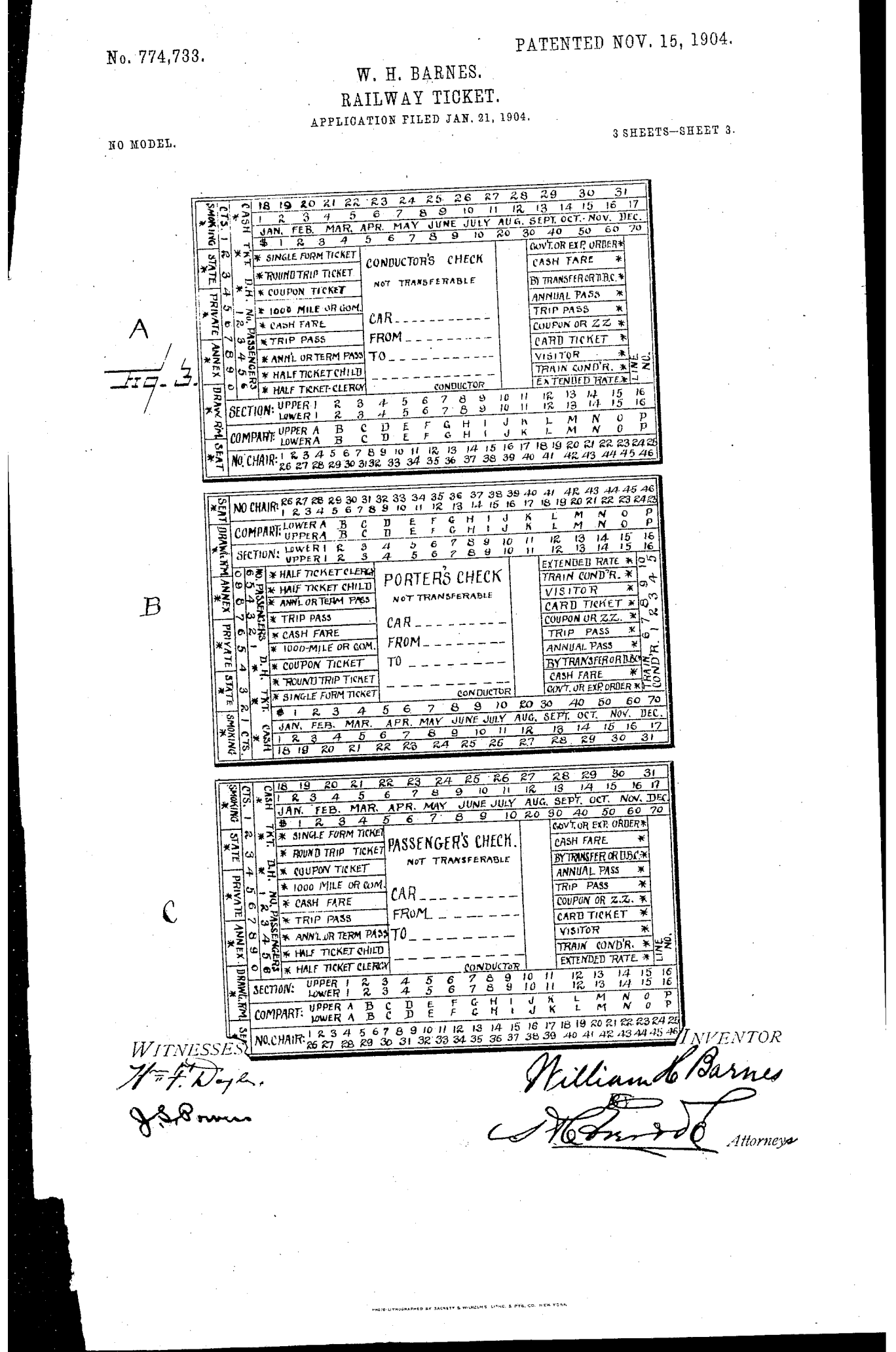

No. 774,733.

PATENTED NOV. 15, 1904.

W. H. BARNES.
RAILWAY TICKET.
APPLICATION FILED JAN. 21, 1904.

NO MODEL.

3 SHEETS—SHEET 3.

WITNESSES

INVENTOR
William H. Barnes

Attorneys

No. 774,733.

Patented November 15, 1904.

UNITED STATES PATENT OFFICE.

WILLIAM H. BARNES, OF CHICAGO, ILLINOIS.

RAILWAY-TICKET.

SPECIFICATION forming part of Letters Patent No. 774,733, dated November 15, 1904.

Application filed January 21, 1904. Serial No. 190,032. (No model.)

*To all whom it may concern:*

Be it known that I, WILLIAM H. BARNES, a citizen of the United States of America, residing at Chicago, in the county of Cook and State of Illinois, have invented certain new and useful Improvements in Railway - Tickets, of which the following is a specification, reference being had therein to the accompanying drawings.

My invention relates especially to that class of tickets which are known and called "quadruple" and "triplex" coupon railway-tickets, used in combination with a railroad ticket or pass for travelers who desire to obtain the benefits of extra comfort while traveling on sleeping-cars, parlor-cars, or accommodation-cars, and to whom a ticket is issued at a prescribed place of purchase along the line of travel to the prescribed place of destination, as in the ticket herewith shown in Figures 1 and 2, the place of purchasing in this instance, for example, being from Quincy and the destination being Chicago. Thus a passenger purchases a sleeping-car ticket at the ticket-office at Quincy and is in return handed the three remaining attached coupons or stubs, making a triplex-coupon ticket of either the form of Fig. 1 or 2.

These tickets are furnished the seller in blocks or books designated by serial number, as "J 296," and consecutively numbered—as, for example, in this instance "J 555, 743"—*i. e.*, each seller has the number designated by a serial letter and number, and each ticket is consecutively numbered. The first stub of the ticket is an auditor's stub, as is shown in Figs. 1 and 2, under letter D. Such stub is a counterpart of the stubs or coupons thereto attached marked, respectively, C, B, and A. The stub or coupon C, B, and A are handed to the purchaser by the seller, the buyer or purchaser when entering upon his journey hands the same to the conductor, and the conductor detaches the coupon-stub C from the coupons or stubs C, B, and A, comprising the ticket, returning balance of ticket B and A to the passenger, when along comes the porter, who takes up the coupon-stub B and hands to the passenger the last coupon-stub marked A, all of which coupons are and each is a counterpart of each other and a means for checking, whereby the palace or sleeping car company and the railroad company, as well as the passenger, each possesses and has a means for checking by punching out the indicated stars and punching out the blank spaces designated by stars on the left of spaces showing seat, chair, berth, section, compartment, &c., and which when so punched out at the left side of blank designated by stars and by the punch of the ticket-seller, as the case should be, the ticket described, as set forth in Fig. 1, will prove a means whereby all of the incidents of purchase, as well as all travel relating to every incident connected with the purchase and disposition and use of such ticket, showing the location of privileges purchased, as well as the number of train, place of purchase and destination, the amount of money paid for such privileges, and the number of persons entitled to such privilege, and the kind of privileges or accommodations purchased, the line of travel and route, and on what train such accommodation or privileges were or are to be furnished.

Fig. 3 is a triplex-coupon ticket sold on the train and is composed of stubs marked, respectively, A, B, and C. The same perform similar or like services that the coupons or stub system described in the specification with relation to Figs. 1 and 2, the difference, however, being that the conductor becomes the seller of the privilege purchased, while in the other tickets, Figs. 1 and 2, a seller may be a ticket-seller not connected with the running of the train where such privileges are bought or sold. In this instance any person desiring to purchase a ticket for a berth-compartment, section, state-room, &c., or any privilege whatever for sale on the line of travel or journey and not being able, or being prevented from purchasing such accommodation at any given point, may enter such car as is for sale the privileges herein mentioned and can obtain same from the conductor of said car or train, as the case may be, and in such event the stars, letters, and numbers in the respective spaces will designate the date, day and year, and amount and place of accommodation, as well as the space to be filled and place of purchase and destination, and if said occupant or passenger be on the free list or traveling by pass the same is also designated on said coupons or stubs in like manner in spaces made for such purchases. This ticket is composed of a conductor's check (designated A) and porter's check (designated B) and a passenger's check, (designated C,) which gives the name or number of the car and from what place and to what place the ticket holds good and is signed by the conductor, both the conductor and porter being required to send the stubs or coupons A and B to the auditor of the transportation company after same has been sold and used, and each is a check one on the other as to all incidents relating to the travel and use thereof, as is shown in such coupons or stubs. The same are identified by the same system of numbers by serials and consecutive number as coupon-ticket figures "1" and "2." The left-hand space, as is shown in Figs. 1 and 2, are indicated for this purpose as "J 296, 555, 743," the smaller number indicating the office number and the larger number the consecutive number in Fig. 3, a space or margin on the right of middle of ticket being left blank for such purpose, same being in a center square on each coupon. The coupons on each ticket designated as "auditor's stub" conductor, porter, and passenger are all printed on one sheet and are printed on paper or board with perforated lines P cut so as to be easily detached one from the other and are printed alternately in the reverse, so that if, for instance, on coupon D the star on the left of the word "state" and in figure "3" of the space designated "passengers" and the column marked "dollars" where same is shown by figure "9" was punched by the ticket-seller. By folding said ticket the punch through one ticket would make each alike and all tickets would be punched and read alike and each would show the entire transaction—*i. e.*, it would show that the state-room with three passengers had paid nine dollars for the accommodation.

Fig. 2 is a modification of ticket shown in Fig. 1 and is limited to a particular accommodation—as, for instance, double or lower berth—but is formed of coupons and stubs similar to Fig. 1, and has the means for checking herein set forth, and is sold for convenience of travelers by ticket-sellers who have permission to dispose of same and is limited in its accommodation. The modification consists in limiting the accommodation to a double, lower, or upper berth in a sleeping-car or whatever is specified thereon, while the tickets shown in Figs. 1 and 3 are more extensive in their scope.

The ticket or coupons shown in Fig. 3 are nearly like the ticket shown in Fig. 1, save that same are sold on the train, while the others are sold by local agents. The tickets herein described in Figs. 1 and 2 are to be stamped by the ticket-seller, who will stamp the same on the back of each coupon, indicating the date, month, and year when the ticket was issued.

Fig. 3 has punch-blanks, to be punched out by the seller, which indicates the date and month when ticket was sold. The location of privileges purchased in Figs. 1 and 2 are to be filled out by ink or pencil, and the accommodations secured are to be punched out on left space, (indicated by stars, Fig. 1. Such accommodations are seat, chair, berth, section, compartment, train-room, annex-room, private room, state-room, smoking-room, and whether upper or lower.

The purpose and object of this system of tickets is to prevent confusion, trouble, anxiety, and mistakes, and to maintain integrity between the employes, traveling public, and employers. This is done under the system herein described by the checking system of the local agent against the conductor, the conductor against the porter, the porter against the conductor and ticket seller, and the passenger against them all. For instance, should the train-conductors come along and discover in the hands of the passenger a ticket issued on the train, (shown in Fig. 3,) he could call upon the issuing conductor to show him the conductor's slip or part of the triplex to see that same corresponded with the passenger's coupon. Should same be demanded under system described in connection with Figs. 1 and 2, the same incidents could be ascertained either by the conductor or any person whose duty it is to examine into the affairs of its conductors and porters. Besides, this method of checking is a means for preventing frauds on the transportation company, and this is accomplished by this checking and punching system, and if the local agent sells or disposes of such accommodations as are for sale on such sleeping-cars it leaves less work and less duties to be performed by the servants of said transportation company and less likelihood of combinations or chances for collision between passengers and transportation servant.

This system makes it known to the auditor of the transportation by the various stubs or coupons which are to be forwarded and reported to the auditor, together with the coupons detached, from incident connected with the sale and handling of such coupons or stubs, and same performs the method of the checking system herein described.

Having thus fully described my invention, what I claim as new, and desire to secure by Letters Patent, is—

1. A combination-ticket consisting of four coupons or stubs each bearing the same alphabetical designation, the same serial number and same ticket number, one of the coupons or stubs designated to be detached by the seller, one to be detached by the conductor, one to be detached by the porter, and one retained by the passenger, and each coupon having appropriately-designated corresponding numbers indicating the number of passengers for which the ticket was issued, substantially as described.

2. A combination-ticket consisting of four coupons or stubs, each bearing the same alphabetical designation, the same serial number, and the same ticket number, one of the coupons or stubs being designated to be detached by the seller, one to be detached by the conductor, one to be detached by the porter, and one to be retained by the passenger, and each coupon bearing columns of figures appropriately designated to indicate monetary values.

In testimony whereof I affix my signature in the presence of two witnesses.

WILLIAM H. BARNES.

Witnesses:
LOUIS H. BERGER,
SIMON BERGER.